(12) United States Patent
Lin et al.

(10) Patent No.: US 10,404,301 B2
(45) Date of Patent: Sep. 3, 2019

(54) METHOD FOR LIMITING RADIO NOISE, IN PARTICULAR IN THE FM BAND, BY POLYNOMIAL INTERPOLATION

(71) Applicants: Continental Automotive France, Toulouse (FR); Continental Automotive GmbH, Hannover (DE)

(72) Inventors: Chao Lin, Maurepas (FR); Cyrille Potereau, Saint Arnoult en Yvelines (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/085,654

(22) PCT Filed: Mar. 17, 2017

(86) PCT No.: PCT/FR2017/050626
§ 371 (c)(1),
(2) Date: Sep. 17, 2018

(87) PCT Pub. No.: WO2017/158308
PCT Pub. Date: Sep. 21, 2017

(65) Prior Publication Data
US 2019/0103891 A1     Apr. 4, 2019

(30) Foreign Application Priority Data

Mar. 18, 2016   (FR) ...................................... 16 52301

(51) Int. Cl.
*H04B 1/12*     (2006.01)
*H04B 1/16*     (2006.01)
(Continued)

(52) U.S. Cl.
CPC .......... *H04B 1/123* (2013.01); *H04B 1/1036* (2013.01); *H04B 1/1669* (2013.01); *H04L 25/0214* (2013.01)

(58) Field of Classification Search
CPC ............................. H04B 1/123; H04B 1/1669
(Continued)

(56) References Cited

U.S. PATENT DOCUMENTS

| | | | |
|---|---|---|---|
| 5,261,004 A | 11/1993 | Manlove et al. | |
| 6,008,900 A * | 12/1999 | Green .................... | G01H 9/004 250/227.27 |

(Continued)

OTHER PUBLICATIONS

English translation of the Written Opinion for International Application No. PCT/FR2017/050626, dated Jun. 21, 2017, 6 pages.

(Continued)

*Primary Examiner* — Emmanuel Bayard
(74) *Attorney, Agent, or Firm* — RatnerPrestia

(57) ABSTRACT

A method for limiting impulse noise in a radio signal, in particular in the FM band, that is multiplexed and intended to be received by an FM receiver that is for example located on-board a vehicle. The method includes detecting impulse noise by way of a calculation of a score IND, for a sequence of successive samples of the demodulated radio signal FM MPX, while taking into the account, on the one hand, a capacity to detect a drop in the modulus of the ratio I/Q, which is dependent in particular on data derived from a sensor level, and, on the other hand, a capacity to detect high-frequency noise, which in particular depends on data derived from a sensor modulation.

11 Claims, 2 Drawing Sheets

(51) Int. Cl.
 H04B 1/10 (2006.01)
 H04L 25/02 (2006.01)
(58) Field of Classification Search
 USPC .......................................... 375/346, 350, 351
 See application file for complete search history.

(56) References Cited

U.S. PATENT DOCUMENTS

| | | | | |
|---|---|---|---|---|
| 6,490,318 B1* | 12/2002 | Larsson | ............ | H03H 21/0043 |
| | | | | 375/230 |
| 6,577,851 B1 | 6/2003 | Ecklund et al. | | |
| 6,690,805 B1* | 2/2004 | Tsuji | ............ | H03G 3/345 |
| | | | | 381/13 |
| 7,778,357 B2* | 8/2010 | Alcouffe | ............ | H04L 25/0202 |
| | | | | 375/260 |
| 7,949,320 B1* | 5/2011 | Lee | ............ | H04B 17/318 |
| | | | | 455/205 |
| 2002/0137457 A1* | 9/2002 | Nivens | ............ | H04B 7/18513 |
| | | | | 455/13.4 |
| 2004/0148112 A1* | 7/2004 | Manaka | ............ | G01N 11/16 |
| | | | | 702/42 |
| 2008/0287072 A1* | 11/2008 | Elenes | ............ | H03J 1/0075 |
| | | | | 455/73 |
| 2009/0144004 A1* | 6/2009 | Feldhaus | ............ | G01R 23/16 |
| | | | | 702/77 |
| 2010/0014616 A1* | 1/2010 | Coulson | ............ | H04B 1/1027 |
| | | | | 375/341 |
| 2010/0152600 A1* | 6/2010 | Droitcour | ............ | A61B 5/05 |
| | | | | 600/534 |
| 2010/0260353 A1* | 10/2010 | Ozawa | ............ | G10L 21/0208 |
| | | | | 381/94.3 |
| 2011/0206223 A1* | 8/2011 | Ojala | ............ | G10L 19/008 |
| | | | | 381/300 |
| 2012/0219050 A1* | 8/2012 | Zhang | ............ | H04L 25/022 |
| | | | | 375/227 |
| 2015/0358154 A1* | 12/2015 | Garcia Morchon | .. | H04L 9/0656 |
| | | | | 380/28 |

OTHER PUBLICATIONS

International Search Report and Written Opinion for International Application No. PCT/FR2017/050626, dated Jun. 21, 2017—8 pages.

* cited by examiner

Fig 2
Fig 2A
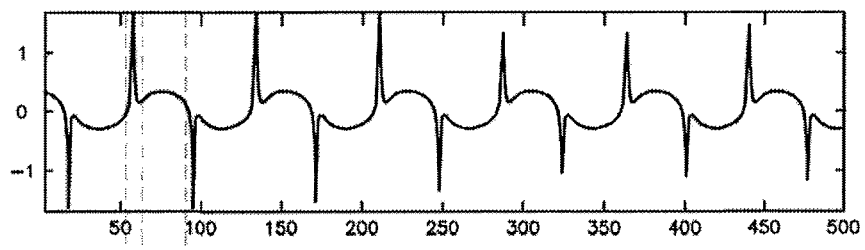
Fig 2B – Prior Art
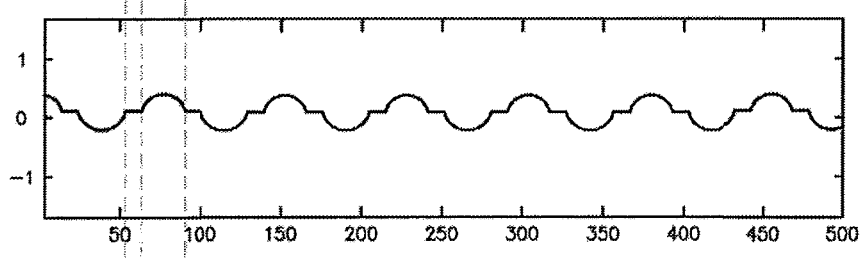
Fig 2C
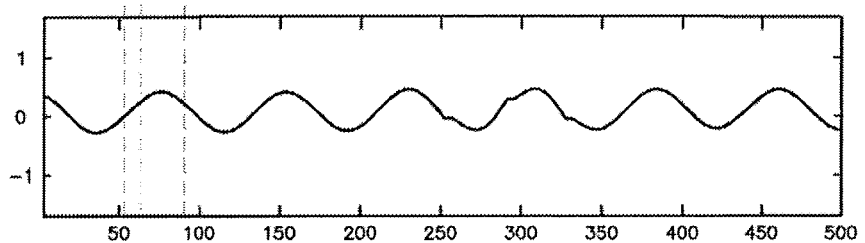

METHOD FOR LIMITING RADIO NOISE, IN PARTICULAR IN THE FM BAND, BY POLYNOMIAL INTERPOLATION

CROSS REFERENCE TO RELATED APPLICATIONS

This application is the U.S. National Phase Application of PCT/FR2017/050626, filed Mar. 17, 2017, which claims priority to French Patent Application No. 1652301, filed Mar. 18, 2016, the contents of such applications being incorporated by reference herein.

FIELD OF THE INVENTION

The invention relates to a method for limiting impulse noise in a radio signal, especially in an FM radio signal, and in particular intended to be implemented in radio receivers located on board motor vehicles.

More precisely, the present invention relates to a method allowing impulse noise to be limited during the return of a radio signal received in the form of a multiplex radio signal.

BACKGROUND OF THE INVENTION

As is known, an FM radio receiver requires means for limiting noise to decrease impulse noise or multi-path noise, which is frequent in multiplexed FM radio signals. Specifically, conventionally, radio signals, in particular in the FM band, intended to be received, especially by radio receivers located on board vehicles, are transmitted multiplexed, with an audio portion, in the audible frequency band, from 0 Hz to 20 kHz, and, at higher frequency, information intended, for example, to allow the reconstruction of stereo sound, or even RDS-related information (RDS standing for Radio Data System, a service for transmitting information in parallel with the audio signal, said information in particular being intended to allow a station to be listened to without interruption during a journey), etc.

In conventional analogue FM radio receivers, noise is often removed with a sample-and-hold circuit, the function of which is to replace a polluted multiplexed signal portion with a blank.

An example of a device the purpose of which is to replace a noisy portion of a signal with a blanking signal portion is in particular described in document U.S. Pat. No. 6,577,851 B1, incorporated herein by reference.

Although it allows peaks of noise that are particularly unpleasant for the listener to be removed, replacing noisy portions with blanks still increases the unpleasantness of listening to the radio.

To mitigate this drawback, more recent digital receivers detect with greater precision peaks in multiplexed radio signals and filter the detected peaks by means of low-pass filters.

Nevertheless, known means for limiting noise in multiplexed FM radio signals have drawbacks, the principal among which are the following.

During the detection of peaks in multiplexed radio signals, the detection of "false positives", which cause the low-pass filter to be applied, degrading the signal, are frequent, above all when the modulation is high.

Moreover, the techniques referred to as blanking techniques, which consist in replacing a signal portion in which impulse noise is present with a blank signal portion, whether this be by application of a low-pass filter or by substitution of a blank signal portion for a polluted signal portion, lead to a discontinuity in the returned signal, which is unpleasant for the listener. Specifically, these discontinuities occur systematically on activation or on deactivation of these blanking means, and this introduces distortion into the returned radio signal.

SUMMARY OF THE INVENTION

There is therefore a need for a limiter of noise in a multiplexed radio signal that eliminates these drawbacks.

To this end, the present invention proposes a method for limiting impulse noise in a radio signal, especially a multiplexed FM radio signal, able to effectively detect impulse noise in the received radio signal and to replace any noisy signal portion with a signal portion reconstructed by polynomial interpolation.

The detection of impulse noise is improved by taking into consideration both the level of the received radio signal, by way of the analysis of the modulus of the ratio between the in-phase component and the quadrature component (I/Q modulus) of the modulated received radio signal, and the modulation of the received radio signal, in order to detect the occurrence of high-frequency noise.

The replacement, in the audio signal, of a noisy radio signal portion with a reconstructed radio signal portion is improved because a polynomial interpolation is carried out between a last preserved sample of the demodulated radio signal and a restart sample, so as to eliminate any discontinuity in the returned radio signal, and thus to prevent the radio distortions that result therefrom in known radio receivers.

To this end, one subject of the present invention is a method for limiting noise in a received radio signal, especially in the FM band, said received radio signal being multiplexed according to a quadrature amplitude modulation scheme, said modulated received radio signal comprising an in-phase component and a quadrature component, the received radio signal being demodulated in order to consist of a succession of samples, and said radio signal including a risk of impulse noise liable to degrade a returned radio signal, said method comprising the following steps:

- a first step of detecting a drop in the modulus of the ratio between the in-phase component and the quadrature component of the modulated received radio signal, depending on the average modulus over time of the modulated received radio signal;
- a second step of detecting high-frequency noise in the demodulated received radio signal, depending on a threshold, said threshold being determined dynamically depending on the modulation of the modulated received radio signal;
- a third step of calculating an impulse noise score, said impulse noise score being dependent on the detection carried out in the first step and on the high-frequency noise detection carried out in the second step;
- depending on the impulse noise score calculated in the third step, a fourth step of determining a number of samples, forming a sequence of samples to be substituted, between a last preserved non-noisy sample and a restart non-noisy sample, in the demodulated received radio signal;
- a fifth step of creating a sequence of substitution samples, by polynomial interpolation between the last preserved non-noisy sample and the restart non-noisy sample; and
- a sixth step of returning a modified demodulated radio signal corresponding to the demodulated received radio signal in which the sequence of samples to be substituted has been replaced by the sequence of substitution samples.

By virtue of the method according to an aspect of the invention, the occurrence of impulse noise in a received modulated radio signal is effectively detected and satisfactorily corrected.

According to one embodiment, in the fifth step, the polynomial interpolation is based on a polynomial estimated depending on a plurality of non-noisy samples located before the sequence of samples to be substituted in the demodulated received radio signal and on a plurality of non-noisy samples located after the sequence of samples to be substituted in the demodulated received radio signal.

According to one embodiment, the detection $detec_{drop_n}$ of a drop in the modulus of the ratio between the in-phase component and the quadrature component of the received radio signal equals:

$$\begin{matrix} 1 \\ norm(I_n, Q_n) \geq Thr_{drop_n} \\ 0 \end{matrix}$$

where $Thr_{drop_n}$=f(Sensor level) and f(•) is a linear function.

According to one embodiment, the detection $detec_{noise_n}$, depending on a dynamically determined threshold, of high-frequency noise in the demodulated received radio signal, equals:

$$\begin{matrix} 1 \\ HPF(MPX_n) \geq Thr_{noise_n} \\ 0 \end{matrix}$$

where $Thr_{noise_n}$=f(Modulation sensor) and f(•) is a linear function.

According to one embodiment, the score IND is equal to:

$$\Sigma_{n=0}^{N-1}(detec_{drop_n} \text{ \& } detec_{noise_n})$$

where N is the number of samples of the demodulated received radio signal (FM MPX) of which account is taken, corresponding for example to the size of a dedicated buffer memory.

Advantageously, the polynomial interpolation is implemented between a preceding sequence of clean samples terminating with the last preserved sample and a subsequent sequence of clean samples starting with the restart sample.

The present invention also relates to a radio-receiving device able to receive and to demodulate a multiplexed radio signal, comprising a noise-limiting device comprising means for implementing the method for limiting noise in a received radio signal, in particular in the FM band, having all or some of the aforementioned features.

BRIEF DESCRIPTION OF THE DRAWINGS

Aspects of the invention will be better understood upon reading the following description, given solely by way of example, and with reference to the appended drawings, in which:

FIGS. 2A-2C show graphs illustrating the quality of the processing obtained by implementing the method according to an aspect of the invention with respect to the prior art.

DETAILED DESCRIPTION OF THE PREFERRED EMBODIMENTS

Figure 1:
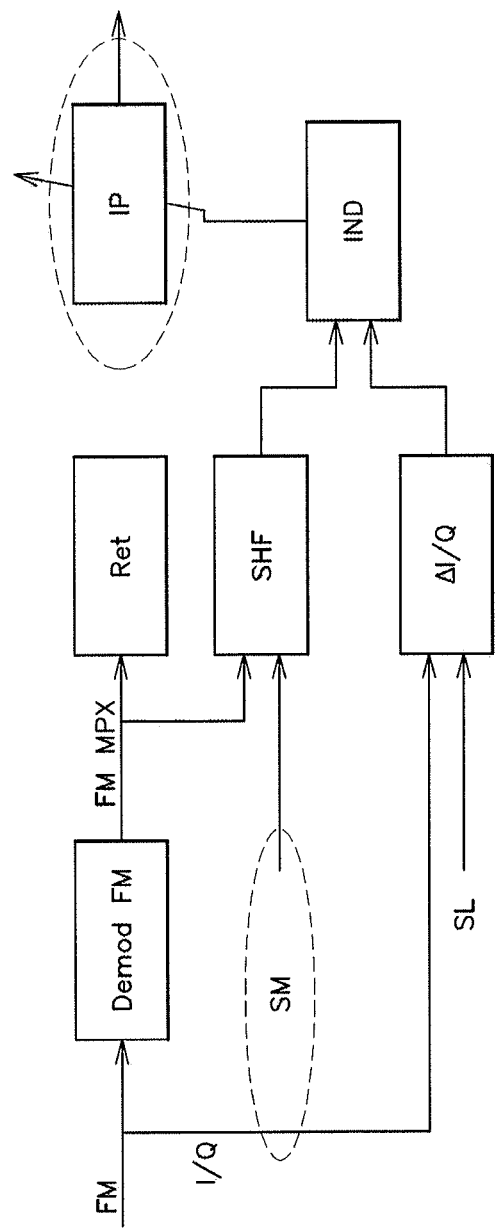
FIG. 1 shows a block diagram illustrating the operation of the method for limiting impulse noise in a radio signal, according to an aspect of the invention.

It should be noted that the figures disclose an aspect of the invention in a detailed manner so as to enable the implementation thereof, said figures also being able to serve to better define an aspect of the invention, of course.

An aspect of the invention is mainly presented with a view to an implementation in a radio receiver located on board a motor vehicle. However, other applications are also targeted by aspects of the present invention, in particular for the purpose of an implementation in contexts other than a motor vehicle.

With reference to FIG. 1, the method for limiting multi-path or impulse noise in a received radio signal FM comprises calculating a score IND associated with noise present in the received radio signal FM. This score IND allows smart detection of noise.

Thus, the FM received signal is modulated, as is known, using a multi-path modulation technique, the modulated FM received signal having an in-phase component I and a quadrature component Q.

It is also known that the modulus of the ratio I/Q is able to reveal the probability of presence of impulse noise in the received radio signal FM. Thus, the method according to an aspect of the invention makes provision for a detection of the drop in the I/Q modulus, denoted ΔI/Q in FIG. 1.

Specifically, it is more probable to find impulse noise in the received radio signal FM when the I/Q modulus drops spectacularly.

According to an aspect of the invention, the detection of the drop in the I/Q modulus consists in comparing the I/Q modulus at a given time to a threshold determined dynamically depending on the longer-term variation in the level of the radio signal, in other words depending on the average modulus over time of the modulated received radio signal, which is given by the sensor level SL, which indicates the radiofrequency (RF) level of the received radio signal FM.

The method according to an aspect of the invention moreover makes provision for the detection of high-frequency noise in the demodulated radio signal FM MPX, via a sensor noise, which indicates the existence of high-frequency components in the demodulated radio signal FM MPX, while taking into account sensor modulation SM, which indicates the modulation level of the desired signal. Thus, the high-frequency-noise sensor SHF detects the occurrence of high-frequency peaks in the demodulated radio signal FM MPX, by comparing these peaks to a frequency threshold determined dynamically depending on the modulation of the desired signal, which is given by the sensor modulation SM. Thus, the higher the modulation index, the higher the threshold of detection of peaks.

The threshold of detection of the peaks, which are characteristic of the impulse noise, thus varies dynamically. The dynamic determination of these thresholds allows the detection of "false positives" (peaks not corresponding to impulse noise) to be avoided, and thus distortion in the returned radio signal to be minimized. Thus, if the modulation of the signal increases, the threshold of detection of these peaks also increases.

As is shown in FIG. 1, the information output by the high-frequency-noise sensor SHF and the information relating to the detection of any drop in the modulus of the ratio I/Q is then combined to calculate the score IND.

To generate the information output by the high-frequency-noise sensor SHF, account is taken of the sensor modulation SM and, to allow the detection of a drop in the modulus of the ratio I/Q, account is taken of the sensor level SL. In this way, the method according to an aspect of the invention allows the presence of peaks in the received radio signal FM, which peaks are characteristic of the presence of impulse noise in said received audio signal FM, to be detected dynamically.

To this end, said information output by the high-frequency-noise sensor SHF and the information relating to the detection of any drop in the modulus of the ratio I/Q is therefore compiled to calculate the score IND, on the basis of which the method according to an aspect of the invention determines the length of the signal portion to be replaced in the demodulated received radio signal FM MPX.

Specifically, the demodulated radio signal FM MPX consists of successive samples. The score IND gives a probability of having impulse noise as a function of time. For example, in a sequence of N samples, from 0 to N samples will be considered to be noisy. Thus, the method according to an aspect of the invention makes provision to determine a number of samples to be replaced, between a last preserved non-noisy sample and a restart non-noisy sample.

According to an aspect of the invention, a sequence of substitution samples is then created by polynomial interpolation IP between said last preserved non-noisy sample and said restart non-noisy sample. To further improve the quality of the polynomial interpolation IP, according to one embodiment, account is taken of a sequence of clean samples terminating with the last preserved sample and a sequence of clean samples starting with the restart sample.

According to one embodiment, the polynomial interpolation IP is based on a polynomial the coefficients of which are estimated depending on a plurality of non-noisy samples located before the sequence of samples to be substituted in the demodulated received radio signal FM MPX and a plurality of non-noisy samples located after the sequence of samples to be substituted in the demodulated received radio signal FM MPX.

It will be noted that the number of samples used to form said plurality of non-noisy samples, before and after the sequence of samples to be substituted, varies depending on the length of the sequence to be substituted, which corresponds to a radio signal portion to be replaced. Specifically, the longer the noisy received radio signal portion, the higher the number of "clean" samples, i.e. non-noisy samples, that will be required, before and after the sequence to be substituted, to achieve a satisfactory construction of the sequence of substitution samples.

Moreover, the number of samples used to form said plurality of non-noisy samples, before and after the sequence of samples to be substituted, also varies depending on the frequency at which noise occurs in the received radio signal FM.

Thus, in other words, the corrupted signal portion is replaced by a signal synthesized on the basis of a polynomial. The coefficients of this polynomial are estimated using the clean signals before and after the portion polluted by the noise.

Given that the sequence of substitution samples has the same frequency component as its neighbors, the distortion created by this processing is minimal.

The method according to an aspect of the invention in particular has the following advantages, namely:

i) the modification of the threshold of detection of peaks depending on the modulation level of the desired signal allows the detection of false positives to be avoided; and ii) replacing the corrupted signal portion with a polynomial interpolation estimated on the basis of neighboring clean signals minimizes the distortion associated with the removal of the noise.

FIG. 2 shows the results of simulations relating to the limitation of noise in a noisy received radio signal FM (FIG. 2A), according to prior-art methods (FIG. 2B) and according to an aspect of the invention (FIG. 2C).

As these graphs show, the signal returned after processing using the method according to an aspect of the invention (FIG. 2C) is exempt both of impulse noise and discontinuities.

In summary, an aspect of the present invention proposes a method for limiting impulse noise in a radio signal, especially in the FM band, that is multiplexed and intended to be received by an FM receiver that is for example located on-board a vehicle.

The method according to an aspect of the invention comprises detecting and evaluating impulse noise by way of the calculation of a score IND, for a sequence of successive samples of the demodulated radio signal FM MPX, while taking into the account, on the one hand, a capacity to detect a drop in the modulus of the ratio I/Q, which is dependent in particular on data derived from a sensor level SL, and, on the other hand, a capacity to detect high-frequency noise, which in particular depends on data derived from a sensor modulation SM.

According to one embodiment, the detection $detec_{drop_n}$ of a drop in the modulus of the ratio I/Q equals:

$$\begin{array}{l} 1 \\ norm(I_n, Q_n) \gtreqless Thr_{drop_n} \\ 0 \end{array}$$

where $Thr_{drop_n}$=f(Sensor level) and f(•) is a linear function.

According to one embodiment, the detection $detec_{noise_n}$ of high-frequency noise equals:

$$\begin{array}{l} 1 \\ HPF(MPX_n) \gtreqless Thr_{noise_n} \\ 0 \end{array}$$

where $Thr_{noise_n}$=f(Modulation sensor) and f(•) is a linear function.

Thus, according to one embodiment, in a sequence of N samples, for example corresponding to the size of a dedicated buffer memory, the score IND is given as a mark ranging from 0 to N−1, where 0 indicates a very clean radio signal and N−1 indicates a very noisy radio signal. In this context, the score IND may be obtained by virtue of the following equation:

$$IND=\Sigma_{n=0}^{N-1}(detec_{drop_n} \& detec_{noise_n}),$$

where N is the number of samples of the demodulated radio signal FM MPX of which account is taken, corresponding for example to the size of a dedicated buffer memory.

Depending on this score IND, the polynomial interpolation proposed by an aspect of the present invention, to replace a polluted signal portion with a reconstructed signal portion, is based on the use of said score IND in order to cancel out a maximum of impulse noise, without generating distortion in the returned radio signal.

It will moreover be noted that an aspect of the present invention also relates to a device for limiting impulse noise, which device is intended for a radio receiver, in particular for an FM radio receiver, implementing the method described above.

Aspects of the present invention are in particular intended to be implemented in the automotive field, but may also be implemented in other fields.

It is clarified furthermore that aspects of the present invention are not limited to the examples described above, and is open to many variants that are accessible to those skilled in the art.

The invention claimed is:

1. A method for limiting noise in a received radio signal, especially in an FM band, said received radio signal being multiplexed according to a quadrature amplitude modulation scheme, said modulated received radio signal comprising an in-phase component and a quadrature component, the received radio signal being demodulated in order to consist of a succession of samples, and said radio signal including a risk of impulse noise liable to degrade a returned radio signal, said method comprising:
   detecting a drop in a modulus of a ratio between the in-phase component and the quadrature component of the modulated received radio signal, depending on an average modulus over time of the modulated received radio signal;
   detecting high-frequency noise in the demodulated received radio signal, depending on a threshold, said threshold being determined dynamically depending on the modulation of the modulated received radio signal;
   calculating an impulse noise score, said impulse noise score being dependent on the drop on the modulus detection and on the high-frequency noise detection;
   depending on the impulse noise score calculated, determining a number of samples, forming a sequence of samples to be substituted, between a last preserved non-noisy sample and a restart non-noisy sample, in the demodulated received radio signal;
   creating a sequence of substitution samples, by polynomial interpolation between the last preserved non-noisy sample and the restart non-noisy sample; and
   returning a modified demodulated radio signal corresponding to the demodulated received radio signal in which the sequence of samples to be substituted has been replaced by the sequence of substitution samples.

2. The method as claimed in claim 1, wherein, the polynomial interpolation is based on a polynomial estimated depending on a plurality of non-noisy samples located before the sequence to be substituted in the demodulated received radio signal and on a plurality of non-noisy samples located after the sequence to be substituted in the demodulated received radio signal.

3. The method as claimed in claim 1, wherein the detecting $detec_{drop_n}$ the drop in the modulus of the ratio between the in-phase component and the quadrature component of the received radio signal equals:

$$\begin{cases} 1 & norm(I_n, Q_n) \geq Thr_{drop_n} \\ 0 & \end{cases}$$

where $Thr_{drop_n}=f(\text{Sensor level})$ and $f(\bullet)$ is a linear function.

4. The method as claimed in claim 1, wherein the detecting $detec_{noise_n}$, depending on the dynamically determined threshold, the high-frequency noise in the demodulated received radio signal, equals:

$$\begin{cases} 1 & HPF(MPX_n) \geq Thr_{noise_n} \\ 0 & \end{cases}$$

where $Thr_{noise_n}=f(\text{Modulation sensor})$ and $f(\bullet)$ is a linear function.

5. The method as claimed in claim 1, wherein, a score IND is equal to:

$$\Sigma_{n=0}^{N-1}(detec_{drop_n} \& detec_{noise_n})$$

where N is the number of samples of the demodulated received radio signal (FM MPX) of which account is taken, corresponding for example to the size of a dedicated buffer memory.

6. The method as claimed claim 1, wherein the polynomial interpolation is implemented between a preceding sequence of clean samples terminating with the last preserved sample and a subsequent sequence of clean samples starting with the restart sample.

7. A radio-receiving device able to receive and to demodulate a multiplexed radio signal, comprising a noise-limiting device comprising means for implementing the method for limiting noise in a received radio signal, as claimed in claim 1.

8. The radio receiving device as claimed on claim 7, wherein the received radio signal is in the FM band.

9. The method as claimed in claim 3, wherein the detecting $detec_{drop_n}$ the drop in the modulus of the ratio between the in-phase component and the quadrature component of the received radio signal equals:

$$\begin{cases} 1 & norm(I_n, Q_n) \geq Thr_{drop_n} \\ 0 & \end{cases}$$

where $Thr_{drop_n}=f(\text{Sensor level})$ and $f(\bullet)$ is a linear function.

10. The method as claimed in claim 2, wherein the detecting $detec_{noise_n}$, depending on the dynamically determined threshold, the high-frequency noise in the demodulated received radio signal, equals:

$$\begin{cases} 1 & HPF(MPX_n) \geq Thr_{noise_n} \\ 0 & \end{cases}$$

where $Thr_{noise_n}=f(\text{Modulations sensor})$ and $f(\bullet)$ is a linear function.

11. The method as claimed in claim 3, wherein the detecting $detec_{noise_n}$, depending on the dynamically determined threshold, the high-frequency noise in the demodulated received radio signal, equals:

$$\sum_{0}^{1} HPF(MPX_n) \gtreqless Thr_{noise_n}$$

where $Thr_{noise_n} = f(\text{Modulation sensor})$ and $f(\bullet)$ is a linear function.

* * * * *

UNITED STATES PATENT AND TRADEMARK OFFICE
CERTIFICATE OF CORRECTION

PATENT NO. : 10,404,301 B2
APPLICATION NO. : 16/085654
DATED : September 3, 2019
INVENTOR(S) : Chao Lin and Cyrille Potereau Page 1 of 1

It is certified that error appears in the above-identified patent and that said Letters Patent is hereby corrected as shown below:

In the Claims

Column 8, Claim 6, at Line 30, "The method as claimed claim 1," should read - The method as claimed in claim 1, -.
Column 8, Claim 8, at Line 40, "The radio receiving device as claimed on claim 7," should read - The radio receiving device as claimed in claim 7, -.

Signed and Sealed this
Fifteenth Day of October, 2019

Andrei Iancu
*Director of the United States Patent and Trademark Office*